United States Patent Office … 3,036,998 — Patented May 29, 1962

3,036,998
POLYMERIC HYDRAZINIUM SALTS
Bernard Rudner, Pittsburgh, Pa., assignor to W. R. Grace & Co., New York, N.Y., a corporation of Connecticut
No Drawing. Filed May 25, 1959, Ser. No. 815,329
10 Claims. (Cl. 260—77.5)

This invention relates to polymeric hydrazinium salts. In one specific aspect it relates to polyurethanes bearing the hydrazinium grouping as an integral part of the polymer. This application is a continuation-in-part of the copending application S.N. 575,314, filed April 2, 1956, and now U.S. Patent 2,889,366.

The novel compositions of my invention are best prepared by the N-amination of a tertiary amine-containing polyurethane or by the N-amination of a tertiary aminoglycol which is then reacted with a polyisocyanate to form the urethane polymer. Because of variations in chain length and degree of cross-linking, my novel polymers exhibit a wide range of possible uses. These products are cationic-active polyelectrolytes useful in the treatment of textiles, paper, leather, etc.

It is, therefore, an object of the present invention to provide a new class of useful polymeric hydrazinium salts containing a multiplicity of the structural units:

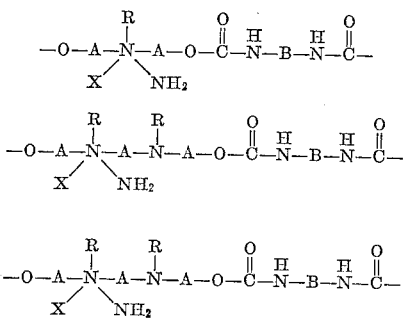

and/or

In the above units, A represents an alkylene radical having 2 to 4 carbon atoms; R represents an alkyl, hydroxyalkyl, carboalkoxyalkyl, dialkylaminoalkyl, hydroxydialkylaminoalkyl or bis-hydroxydialkylaminoalkyl radical; B represents a divalent radical containing 4 to 24 carbon atoms and X represents an anion.

My novel polymers can be made by the reaction of chloramine with a tertiary amine-containing polyurethane as shown

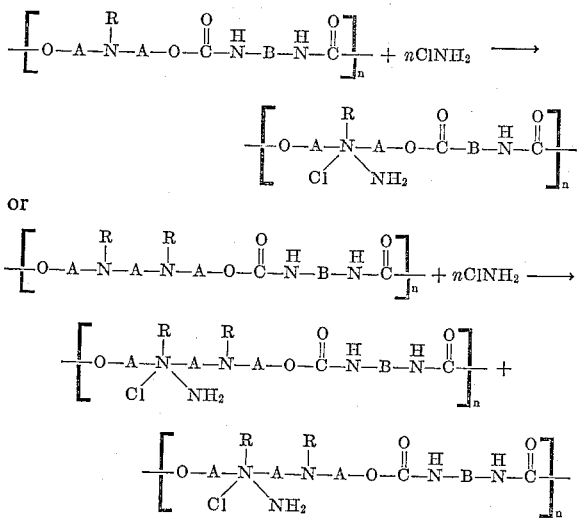

Here A, B and R have the same values as above. More specifically, A may be ethylene and the isomeric propylenes and butylenes. B can bear substituents and may be an aromatic radical such as phenylene, tolylene or napthylene, an aliphatic radical such as butylene, hexylene, or decylene, or a mixed aromatic-aliphatic radical such as that derived from bis- and tris-p-isocyanatotriphenylmethane. R may be an aliphatic radical of any chain length such as ethyl, methyl, lauryl or octadecyl, a hydroxyalkyl or carboxylate ester of the hydroxyalkyl radical, a dialkylaminoalkyl radical such as diethylaminopropyl or mono and dihydroxy derivatives of the N-alkyl groups in a dialkylaminoalkyl radical. R may be any conventional organic side chain that will not deactivate the amine to N-amination; the simplest case would be that where R is an aliphatic group or chain bearing no functions. Often R is hydroxyloweralkyl or hydroxydialkylaminoalkyl and contains a terminal hydroxyl group. Such a hydroxyl group will react readily with any excess isocyanate groups present thereby tying together two chain or cross-linking the polymer. As is well known in the art, such cross-linking increases the molecular weight and softening point of the polymer while at the same time reducing its solubility in organic solvents. Thus the degree of cross-linking of the polymer and hence its physical properties and utility may be controlled by adjusting the ratio of isocyanate equivalents to hydroxyl equivalents. The essential structural units of my novel compositions, however, remain as illustrated above. That is, my polymer consists of long chains made up of one or more of the indicated units. Lastly, X has the value Cl here because it was introduced via chloramination; but X may be any anion. Methods for anion modification will be discussed in detail below.

In preparing the compositions of the present invention via chloramination, it is usually preferable to contact a solution of the reactant urethane polymer in an inert or unreactive hydrocarbon solvent with gaseous chloramine, allow the reaction to proceed until the desired quantity of chloramine is consumed and then isolate and purify the resultant polymeric hydrazinium salt by standard laboratory techniques. While chloramine is most advantageously prepared as a gaseous chloramine-ammonia mixture obtained from a generator constructed according to the teachings of Sisler et al., U.S. Patent 2,710,248, other methods are equally adaptable for the synthesis of chloramine. For instance, it can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. described in Inorganic Syntheses, vol. I, 59 (1939).

Another method of preparing the novel compositions of my invention is the reaction of hydroxylamine-o-sulfonic acid with a tertiary amine-containing urethane polymer. The reaction of tertiary amines with hydroxylamine-o-sulfonic acid produces the hydrazinium sulfate and/or bisulfate corresponding to the tertiary amine used. Preferably the appropriate urethane-amine and hydroxylamine-o-sulfonic acid are allowed to react or are heated together in the presence of an alcoholic or other suitable solvent. A frequent purification step is the treatment of the reaction mixture with a basic substance such as sodium carbonate to remove acidic constituents from the product hydrazinium sulfate which is essentially neutral. Further purification is effected by standard laboratory techniques.

Another approach to the preparation of the novel compositions of my invention is by the reaction of hydrazinium-containing glycols with the appropriate polyisocyanate as shown

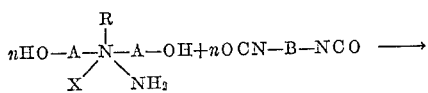

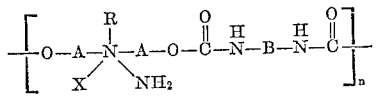

The required hydrazinium-containing glycols are prepared by the reaction of chloramine or hydroxylamine-o-sulfonic acid on the corresponding tertiary amine-containing glycol by the same N-amination reactions discussed above. Certain suitable hydrazinium compounds may also be prepared by alkylation of the appropriate hydrazine compound. The condensation of the glycol and polyisocyanate is best accomplished in a hydrocarbon or halogenated hydrocarbon solvent. After the initial heat of reaction is dissipated, mild heating for an hour or two insures complete urethane formation. When the hydrazinium group is introduced by N-amination of a polyurethane, the molecular weight and degree of cross-linking and hence the properties of the product are fixed by the nature of the reactant polyurethane. This condensation approach is more flexible and finished polymers of varying shades of properties are readily obtained by varying the ratio of hydroxyl groups to isocyanate groups; the product is readily obtained by evaporation of the solvent.

It is obvious that the N-amination reaction yields only the hydrazinium chloride, sulfate and bisulfate and not all the novel polymeric hydrazinium salts of my invention are capable of being prepared directly as described above. In order to provide the other useful salts of the present invention, it is necessary to prepare the compositions containing anions other than those mentioned by metathesis. Certain of the anions can be introduced by mixing aqueous solutions or suspensions of the polymeric hydrazinium chloride with appropriate reagents; the desired product being precipitated directly as the reaction progresses. The use of alcoholic or mixed water-alcohol solvents may prove desirable. Other metathetical approaches are available and the method selected depends on experimental convenience, costs of reagents and the differences in physical properties between the product and the starting chloride to be utilized in their separation. Reaction of a polymeric hydrazinium halide with a soluble silver salt, such as silver nitrate, results in the precipitation of silver halide and the formation of the polymeric hydrazinium nitrate. In an analogous manner, treatment of the sulfate with a soluble barium salt results in the precipitation of barium sulfate and conversion to the anion of the barium salt. Another approach independent of the formation of an insoluble solid, is to react the halide with an excess of the desired anion as its hydrogen acid; hydrogen halide is evolved as the new salt is formed. When it is necessary to prepare a very soluble polymer, the reaction of the polymeric hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

Normally, the choice of the anion is of minor consequence since the primary activity of my novel compositions resides in the cationic portion of the polymer. The salts obtained by variation of the anion may in certain cases have special advantages due to solubility, ease of dispersibility or the like. But these considerations are all subsidiary to the characteristics of the cationic portion which are relatively independent of the nature of the anion. Hence, all anions are considered to be equivalent for the purposes of the present invention.

Various methods have been discussed above for making the novel composition of my invention. Needless to say, they represent only a portion of the approaches available and my invention is not to be limited to any particular mode of preparation of our polymeric compositions.

The scope and utility of my invention is further illustrated by the following examples:

*Example I*

Thirty g. of methyldiethanolamine was added in portions to a solution of 33 g. of toluene-2,4-diisocyanate in 100 ml. of chloroform giving a highly exothermic reaction. The resultant solution was refluxed for 30 minutes and the solvent evaporated on a stream bath leaving a gray white solid. This polyurethane residue was washed first with pentane and then with water, dissolved in 1000 ml. of chloroform and dried with magnesium sulfate and the solution treated over a period of two hours with 1.6 equivalents of chloramine made using a generator constructed according to the teachings of Sisler et al., U.S. Patent 2,710,248. Filtration of the reaction mixture after the reaction had been completed gave a hygroscopic white paste which weighed 84 g. after washing and drying in vacuo. The tacky cohesive polymer contains the structural unit:

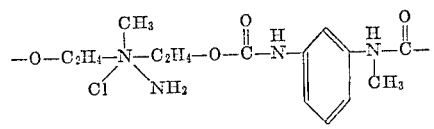

*Example II*

The polymer of Example I was insoluble in chloroform, xylene and heptane but slowly soluble in water and slightly soluble in isopropyl alcohol. Treatment of separate portions of the polymer in aqueous solution with potassium hexafluorophosphate and picric acid caused replacement of the chloride ion by the hexafluorophosphate and picrate ions respectively. The polymer hexafluorophosphate was a granular white solid softening under pressure at 150–156° C. and darkening at about 200° C. while the polymeric picrate was a yellow amorphous solid softening at 125° C. and decomposing about 215° C.

*Example III*

A mixture of hydroxyethylated diamines of the general formula

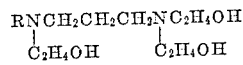

is available commercially as Ethoduomeen T–13. This mixture is prepared by reacting tallowamine with acrylonitrile, reducing the nitrile to the primary amine and reacting the resultant diamine with 3 moles of ethylene oxide. R in the above formula is derived from tallow fatty acids and is hydrogenated at the same time the nitrile was reduced making R predominantly a 1:3 mixture of hexadecyl and octadecyl radicals.

Ethoduomeen T–13 (50 g. in 1000 ml. of xylene) was submitted to chlorination for two hours according to the general approach of Example I and the reaction mixture allowed to stand. Since the clear supernatant liquid contained only negligible quantities of ionic chloride (a measure of the amount of polymeric product present), it was decanted off and discarded. The semisolid residue was taken up in 750 ml. of isopropyl alcohol, freed of ammonium chloride by filtration of the solution and recovered by evaporation of the solvent. The resultant 59 g. of orange-yellow, thixotropic 1,1-bis-(2-hydroxyethyl)-1-[2-(N-hydro-tallow-N-2 - hydroxyethyl)-aminopropyl]hydrazinium chloride was dissolved in 200 ml. of anhydrous chloroform and treated with 35 g. of mixed tolylene diisocyanate isomers commercially available as Nacconate 80 (about 80% 2,4- and 20% 2,6-).

After refluxing for two hours, evaporation of the solvent left 73 g. of a granular polymer, light amber in color as formed but buff once crushed. The product which contained 5.97% chloride was soluble in common organic solvents and self-dispersible in hot water. The two major structural units of our polymeric product are illustrated below:

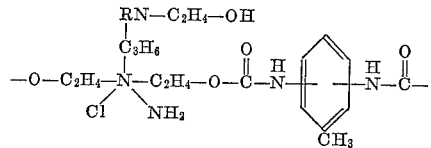

and

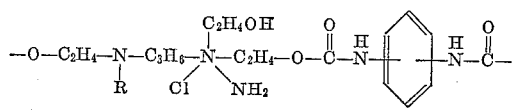

*Example IV*

Fifty g. of the monooleate ester of triethanolamine dissolved in chloroform was run for 3 hours on the chloramine generator using the general method described above. After filtration to remove ammonium chloride and boiling to drive off ammonia, a solution of 15 g. of tolylene diisocyanate (mixed 2,4- and 2,6-isomers) in 250 ml. of chloroform was added to the ester. The reaction mixture was heated at incipient boiling for 2 hours. Evaporation of the solvent followed by vacuum drying gave 57 g. of a light amber resin containing 5.13% ionic chloride and having the structural unit

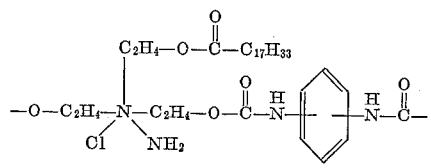

*Example V*

The procedure of the previous example was repeated using 20 g. of the diisocyanate and refluxing for only one hour in lieu of the two hours' heating before. This reactant ratio gave a less cross-linked, lower melting resin than the analogous product of Example IV.

*Examples VI and VII*

Fifty g. of tetra-(2-hydroxypropyl)ethylenediamine dissolved in xylene was run for 3 hours on the chloramine generator. Evaporation of an aliquot show it to contain 5.72% solids analyzing for 2.91% chloride. After the addition of 10 g. of mixed 80:20 2,4- and 2,6-tolylene-diisocyanate, the reaction mixture was heated for 90 minutes at 120° C. After decantation from a small amount of solid, the reaction mixture was evaporated to give 60 g. of a dark extremely viscous oil.

The above procedure was repeated only adding 5 g. of the toluene diisocyanate but heating at 135° C. for 2 hours after the addition. Work-up gave a dark oil similar to the one above but much less viscous because of less cross-linking. Both polymers were water insoluble.

*Examples VIII and IX*

Fifty g. of tetra-(2-hydroxypropyl)ethylenediamine dissolved in chloroform was run for 2 hours on the chloramine generator. After filtration to remove ammonium chloride and boiling to drive off ammonia, 5 g. of mixed toluene diisocyanate isomers were added. The reaction mixture was heated at incipient boiling for 2 hours. Evaporation of the solvent gave 58 g. of viscous yellow oil containing 2.51% ionic chloride similar to the product of Examples VI and VII but much improved in color.

A less cross-linked polymer similar to the one above was prepared using only 2.5 g. of diisocyanate (dissolved in 10 ml. of chloroform). A white curd formed on addition which dissolved to a milky solution. After boiling for one hour, the solvent was evaporated to yield 41 g. of a yellow moderately viscous oil containing 2.51 g. of ionic chloride.

The major structural units of the polymers of Examples VI to IX are shown below:

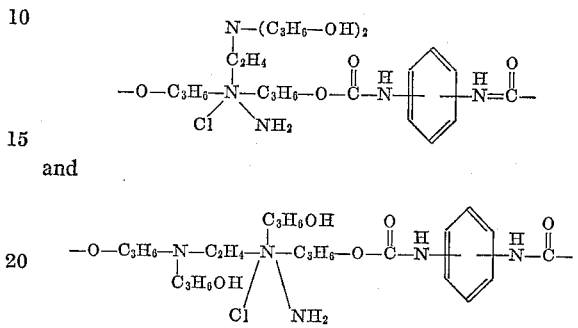

Depending on the availability of further isocyanate groups, the polymer may be further cross-linked through the remaining hydroxyl groups.

*Example X*

A solution of 20 ml. (21.8 g.) of commercial triethanolamine in 50 ml. of xylene was subjected to a

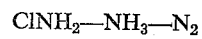

gas stream for 68 minutes. Use of a cold water bath was necessary in order to hold the reaction temperature below 45° C. Chloramine uptake was rapid and approximately 90% complete, all of the chloramine in the reaction flask had been consumed within five minutes after the gas flow had been stopped. The white oil that precipitated during the reaction was separated by decantation, washed with hexane and carbon tetrachloride and then dried in a vacuum desiccator. Heating with limited quantities of isopropyl alcohol gradually converted the oil to a solid, crystalline 1,1,1-tris-(2-hydroxyethyl)-hydrazinium chloride melting at 178 to 180° C. Treatment with a pyridine solution of tris-(p-isocyanatophenyl)methane gave an immediate precipitate of the resin. Here the excess isocyanate groups will react with the hydroxyl groups of the primary structural unit giving a highly cross-linked polymer.

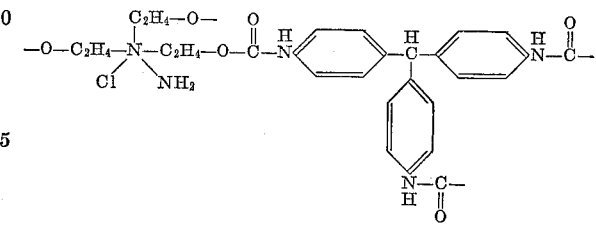

I claim:
1. Polymeric compositions consisting essentially of a multiplicity of the unit:

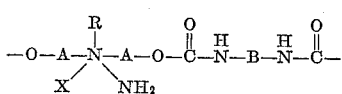

wherein A is an alkylene radical containing 2 to 4 carbon atoms; B is an arylene radical containing 4 to 24 carbon atoms; R is an alkyl radical; and X is an inorganic anion.

2. Polymeric compositions consisting essentially of a multiplicity of units selected from the group consisting of

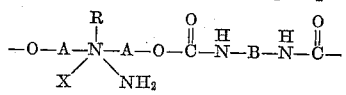

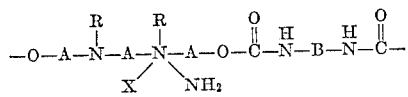

and

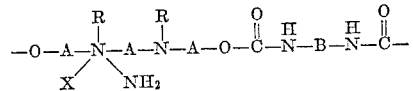

wherein A is an alkylene radical containing 2 to 4 carbon atoms; B is a divalent radical containing 4 to 24 carbon atoms selected from the group consisting of alkylene, arylene and aralkylene; R is a member selected from the group consisting of alkyl, hydroxyalkyl, acyloxyalkyl, dialkylaminoalkyl, hydroxydialkylaminoalkyl and bis-hydroxyalkylaminoalkyl radicals; and X is an inorganic anion.

3. Polymeric compositions consisting essentially of a multiplicity of the unit

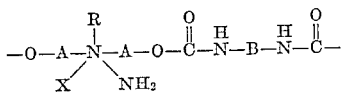

wherein A is an alkylene radical containing 2 to 4 carbon atoms; B is an arylene radical containing 4 to 24 carbon atoms; R is a hydroxydialkylaminoalkyl radical; and X is an inorganic anion.

4. Polymeric compositions consisting essentially of a multiplicity of the unit

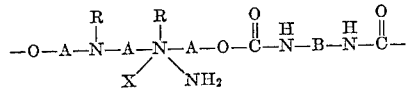

wherein A is an alkylene radical containing 2 to 4 carbon atoms; B is an arylene radical containing 4 to 24 carbon atoms; R is an acyloxyalkyl radical; and X is an inorganic anion.

5. Polymeric compositions consisting essentially of a multiplicity of the unit

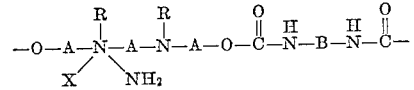

wherein A is an alkylene radical containing 2 to 4 carbon atoms; B is an arylene radical containing 4 to 24 carbon atoms; R is a radical; and X is an inorganic anion.

6. Polymeric compositions consisting essentially of a multiplicity of the unit

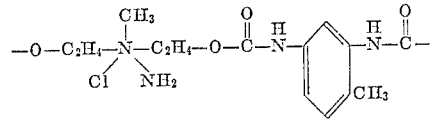

7. Polymeric compositions consisting essentially of a multiplicity of the unit

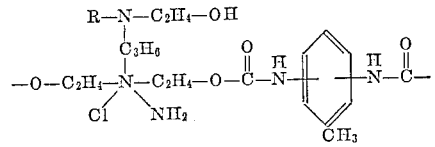

wherein R represents hexadecyl and octadecyl radicals present in about a 1:3 ratio.

8. Polymeric compositions consisting essentially of a multiplicity of the unit

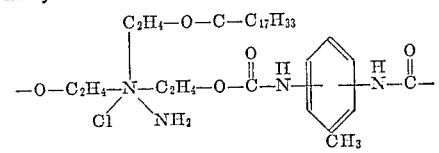

9. Polymeric compositions consisting essentially of a multiplicity of the unit

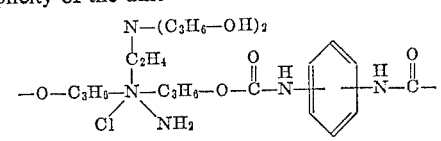

10. Polymeric compositions consisting essentially of a multiplicity of the unit

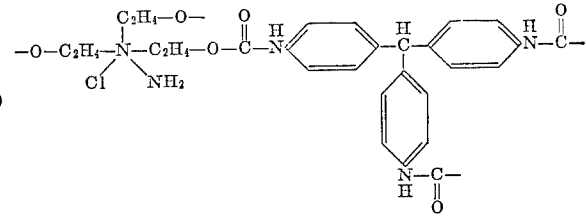

References Cited in the file of this patent
UNITED STATES PATENTS
2,889,366   Rudner _____ June 2, 1959